United States Patent [19]

Colman et al.

[11] Patent Number: 5,050,236

[45] Date of Patent: Sep. 17, 1991

[54] RADIO FREQUENCY FIELD STRENGTH ENHANCER

[75] Inventors: Thomas G. Colman, Arlington Heights, Ill.; Gregg Rasor, Boynton Beach, Fla.

[73] Assignee: Motorola, Inc., Schaumburg, Ill.

[21] Appl. No.: 532,774

[22] Filed: Jun. 4, 1990

[51] Int. Cl.[5] ........................ H01Q 7/08; H01Q 11/12; H04B 1/18

[52] U.S. Cl. .................................... 455/193; 343/744; 343/748; 455/289; 455/292

[58] Field of Search ............... 455/193, 261, 270, 280, 455/286, 292, 289; 343/702, 741, 744, 788; 340/311.1

[56] References Cited

U.S. PATENT DOCUMENTS

| | | | |
|---|---|---|---|
| 2,790,899 | 4/1957 | Townsend | 455/351 |
| 3,518,681 | 6/1970 | Kiepe | 455/292 |
| 4,193,076 | 3/1980 | Ito et al. | 343/702 |
| 4,805,232 | 2/1989 | Ma | 455/291 |
| 4,806,906 | 2/1989 | Oda et al. | 340/311.1 |
| 4,814,776 | 3/1989 | Caci et al. | 343/702 |
| 4,873,527 | 10/1989 | Tan | 343/718 |

*Primary Examiner*—Curtis Kuntz
*Assistant Examiner*—Chi H. Pham
*Attorney, Agent, or Firm*—Gregg Rasor; William E. Koch

[57] ABSTRACT

A radio frequency field strength enhancement system (402) having a member (404) with at least one tuning impedance (405) for adjusting a desired frequency response associated with the member (404) and means for retaining (408) the member (404) in close proximity to a radio frequency communication device (401) having an integrally mounted antenna system (214). When the radio frequency communication device (401) is brought within close proximity of the RF field strength enhancer (402), the power received or transmitted by the integrally mounted antenna system (214) in the RF communication device (401) is enhanced.

3 Claims, 2 Drawing Sheets

RADIO FREQUENCY FIELD STRENGTH ENHANCER

FIELD OF THE INVENTION

This invention relates in general to radio frequency receiver and transmitter systems, and more particularly to the enhancement of the electromagnetic fields in close proximity to a radio frequency communication device.

BACKGROUND OF THE INVENTION

In contemporary communication systems, radio frequency receivers or transmitters receive or transmit an RF (radio frequency) signal using an antenna that is directly coupled via discrete components (usually a RF matching network) to the input or output of an amplifier of a receiver or transmitter, respectively.

Presently, there are two configurations for antennae on RF transceivers: internal and external. Internal antennae are typically much less efficient at transferring power to or from the transceiver because of their physical size (they must fit inside the housing) and the effective radio frequency loading presented to the antenna by the housing and nearby electronic components. Conversely, external antennae do not exhibit as much degradation in efficiency and maintain their directivity (pattern and gain) better than an internal antenna since they are located primarily in free space. That is, they are not surrounded by a housing. By locating the antenna in free space, the effects of loading caused by the radio's housing and components are minimized.

When designing a radio device, if the required system power gain dictates that a more efficient antenna is required, the designer is forced to trade off an increase in the overall physical dimensions of the device in order to use a high gain, high efficiency antenna system. However, previous attempts to improve receiver sensitivity or a transmitter's ERP (effective radiated power) in a portable RF transmitter or receiver with an internal antenna have centered around the physical and electrical attachment of another independent antenna structure to a port coupled to the unit's existing antenna system or amplifier connection port. Although some of these attempts have been operationally successful to some degree, problems associated with imperfect, complicated, and expensive physical contacting schemes remain. These problems include (but are not limited to) the loss of an effective RF electrical contact at the antenna interface resulting from vibration, corrosion, or improper assembly. Other problems that arise when coupling directly to an existing antenna system are detuning and skewing the frequency response of the existing antenna as well as altering the impedance, thus degrading the overall performance of the overall antenna system even though an external antenna has been added to the system.

SUMMARY OF THE INVENTION

In carrying out the preceding, there is provided a radio frequency field strength enhancement system having a member with at least one tuning impedance for adjusting a desired frequency response associated with the member and means for retaining the member in close proximity to a radio frequency communication device having an integrally mounted antenna system. When the radio frequency communication device is brought within close proximity of the RF field strength enhancer, the power received or transmitted by the integrally mounted antenna system in the RF communication device is enhanced.

DESCRIPTION OF A PREFERRED EMBODIMENT

Figure 1:
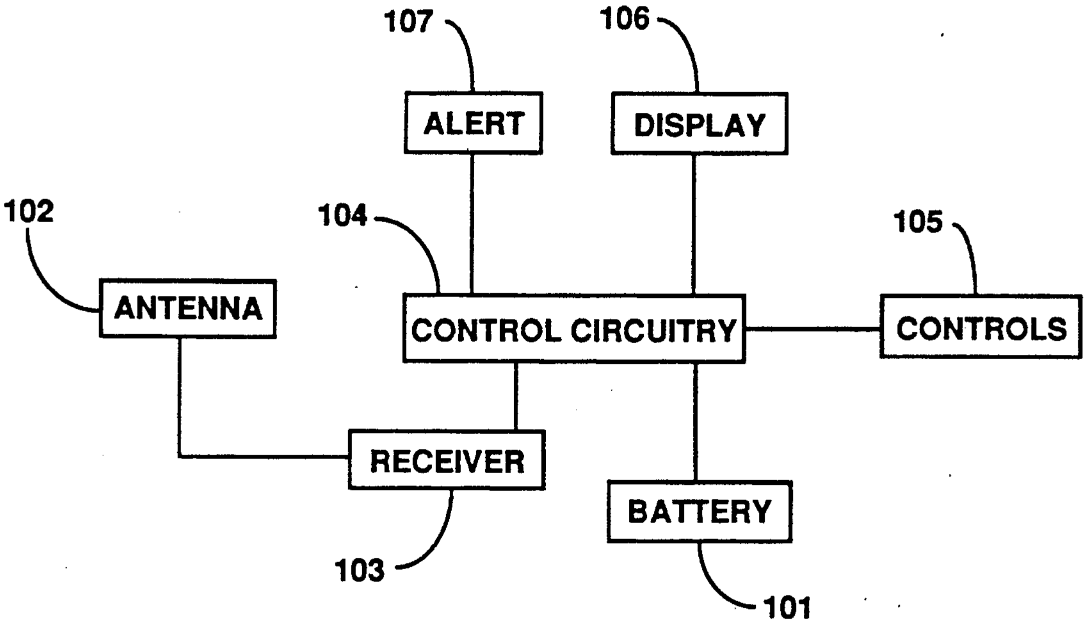
FIG. 1 is a block diagram of a selective call information display receiver.

Referring to FIG. 1, a battery (101) powered selective call receiver operates to receive a signal via an antenna 102. The received signal is routed from the antenna 102 to a receiver 103. The receiver 103 demodulates the received signals using conventional techniques and forwards the demodulated signal to a control circuit 104, which decodes and recovers information contained within the received signal. In accordance with the recovered information and user controls (105), the selective call receiver presents at least a portion of the information, such as by a display 106, and signals the user via an audible or sensible alert 107 that a message has been received. The user may then view the information presented on the display 106.

The control circuit 104 shown in FIG. 1, preferably comprises signal multiplexing integrated circuits, a microcomputer, a digital memory coupled to the microcomputer, environmental sensing circuitry such as for light or temperature conditions, audio power amplifier circuitry, control interface circuitry, and display illumination circuitry. These elements are arranged in a known manner which when assembled provides the display information receiver as requested by the customer.

Figure 2A:
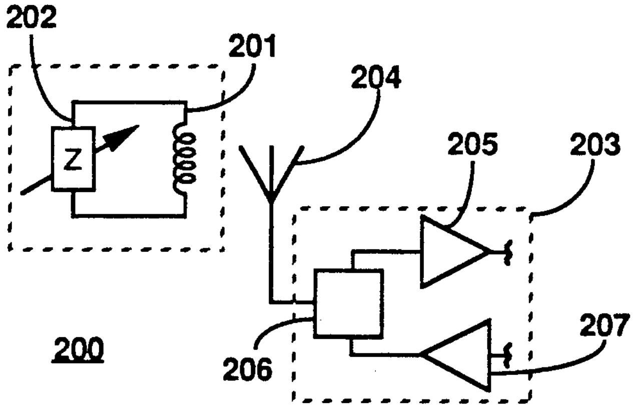
FIG. 2A is a system diagram of a radio frequency field strength enhancer in accordance with the preferred embodiment.

Referring to FIG. 2A, the radio frequency field strength enhancement system 200 comprises a member 201 (shown as a coil representing an antenna structure such as a loop, whip, dipole, or other radiation pick-up device) connected in parallel with at least one tuning impedance 202 (shown as Z) and a radio frequency communication device 203 having an integrally mounted antenna system 204 coupled to a RF (radio frequency) receiver's amplifier 205 through a duplexer impedance matching and isolation network 206. In the case where the RF communication device 203 requires a transmit function, the duplexer 206 permits the coupling of the antenna system 204 to the output of an RF power amplifier 207 in the transmit mode, thus protecting the receiver's RF amplifier 205 from the transmitted RF power. In a receive only embodiment, the duplexer impedance matching and isolation network 206 can be simplified to include only an impedance matching function to provide maximum power transfer from the antenna system 204 to the input of the receiver's RF amplifier 205.

Enhancement of a received signal is accomplished by electromagnetically coupling energy received by the member 201 (which acts as a high efficiency antenna) within the radio frequency field strength enhancement system 200 to the radio frequency communication device's 203 integrally mounted antenna system 204. For a signal transmitted by the radio frequency communication device 203, the integrally mounted antenna system 204 radiates a signal that is electromagnetically coupled to the member 201 (which acts as a high efficiency antenna) within the radio frequency field strength enhancement system and re-radiated by the member at a higher ERP. In all cases, the radio frequency communication device's 203 integrally mounted antenna system 204 has a lower efficiency than the antenna within the radio frequency field strength enhancement system 200. The lower efficiency realized by the radio frequency communication device's 203 integrally mounted antenna system 204 is caused primarily by the effective radio frequency loading presented to the antenna system 204 by the radio frequency communication device's 203 housing, chassis, circuit substrate, components, and other nearby objects that are not suitable low loss RF dielectrics. This loading (best case) causes a change in the radiation resistance ($R_r$) associated with the integrally mounted antenna system 204, thus causing a mismatch between the expected impedance of the antenna system 204 and the optimal impedance to which the duplexer impedance matching and isolation network 206 was designed and lowering the overall efficiency. Other factors that degrade the antenna system's 204 efficiency are the alteration of the antennae pattern and directivity.

In the embodiment shown in FIG. 2A, the rádio frequency communication device 203 has its antenna 204 mounted in "free space," that is, the antenna is not fully enclosed by the RF communication device's 203 housing.

The mode of signal coupling between the radio frequency field strength enhancement system 200 and the radio frequency communication device's 203 integrally mounted antenna system 204 may be capacitive when the member 201 is for example, a half wave linear antenna structure that is primarily an E (electric) field antenna, inductive when the member 201 is for example, a broadband transformer coupled loop structure that is primarily a H (magnetic) field antenna, or hybrid when the antenna structure possesses characteristics of both E and H field antennae. In a receiving embodiment, enhancement takes place when the electromagnetic energy received by the member 201 is re-radiated and coupled to the radio frequency communication device's 203 integrally mounted antenna system 204. For a transmit embodiment, enhancement takes place when the electromagnetic energy transmitted (radiated) by the radio frequency communication device's 203 integrally mounted antenna system 204 couples into the higher efficiency member 201 and is re-radiated at a higher ERP.

Figure 2B:
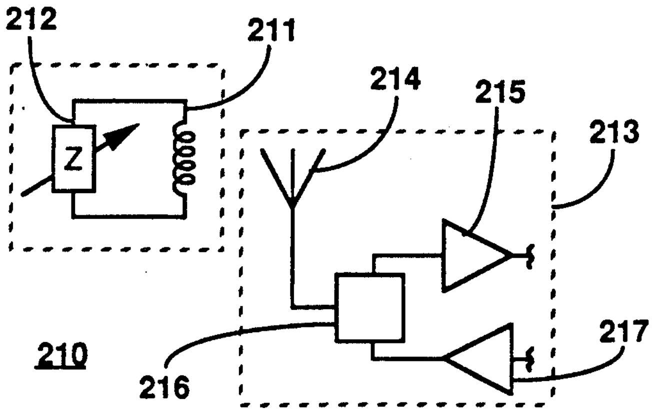
FIG. 2B is a system diagram of a radio frequency field strength enhancer in accordance with the preferred embodiment.

Referring to FIG. 2B, the radio frequency field strength enhancement system 210 comprises a member 211 (shown as a coil) connected in parallel with at least one tuning impedance 212 (shown as Z) and a radio frequency communication device 213 having an integrally mounted internal antenna system 214 coupled to a RF (radio frequency) receiver's amplifier 215 through a duplexer or impedance matching network 216. In the case where the RF communication device 213 requires a transmit function, the duplexer 216 controls the switching of the antenna system 214 to the output of an RF power amplifier 217 and insures proper protection of the receiver's RF amplifier 215 from the transmitted RF power.

Figure 3A:
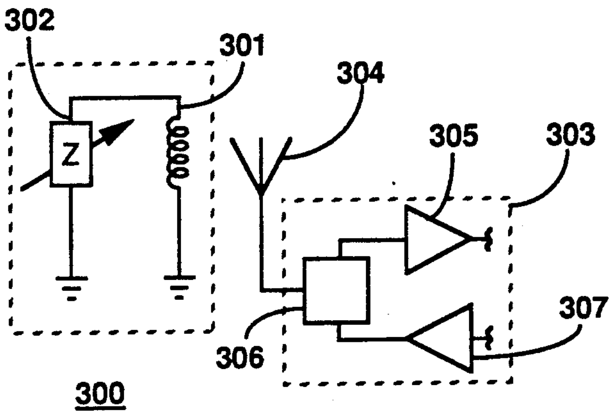
FIG. 3A is a system diagram of a radio frequency field strength enhancer in accordance with the preferred embodiment.

Referring to FIG. 3A, the radio frequency field strength enhancement system 300 comprises a member 301 (shown as a coil) connected in series with at least one tuning impedance 302 (shown as Z) and a radio frequency communication device 33303 having an integrally mounted antenna system 304 coupled to a RF (radio frequency) receiver's amplifier 305 through a duplexer impedance matching network 306. In the case where the RF communication device 303 requires a transmit function, the duplexer 306 controls the switching of the antenna system 304 to the output of an RF power amplifier 307 and insures proper protection of the receiver's RF amplifier 305 from the transmitted RF power.

In the embodiment shown in FIG. 3A, the radio frequency communication device 303 has its antenna 304 mounted in "free space," that is, the antenna is not fully enclosed by the RF communication device's 303 housing.

Figure 3B:
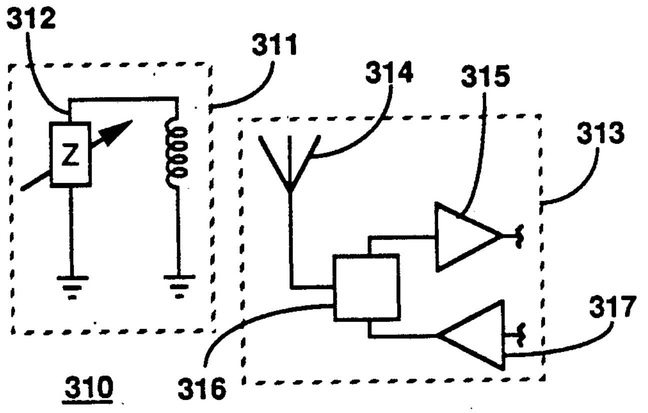
FIG. 3B is a system diagram of a radio frequency field strength enhancer in accordance with the preferred embodiment.

Referring to FIG. 3B, the radio frequency field strength enhancement system 310 comprises a member 311 (shown as a coil) connected in series with at least one tuning impedance 312 (shown as Z) and a radio frequency communication device 313 having an integrally mounted internal antenna system 314 coupled to a RF (radio frequency) receiver's amplifier 315 through a duplexer or impedance matching network 316. In the case where the RF communication device 313 requires a transmit function, the duplexer 316 controls the switching of the antenna system 314 to the output of an RF power amplifier 317 and insures proper protection of the receiver's RF amplifier 315 from the transmitted RF power.

Figure 4:
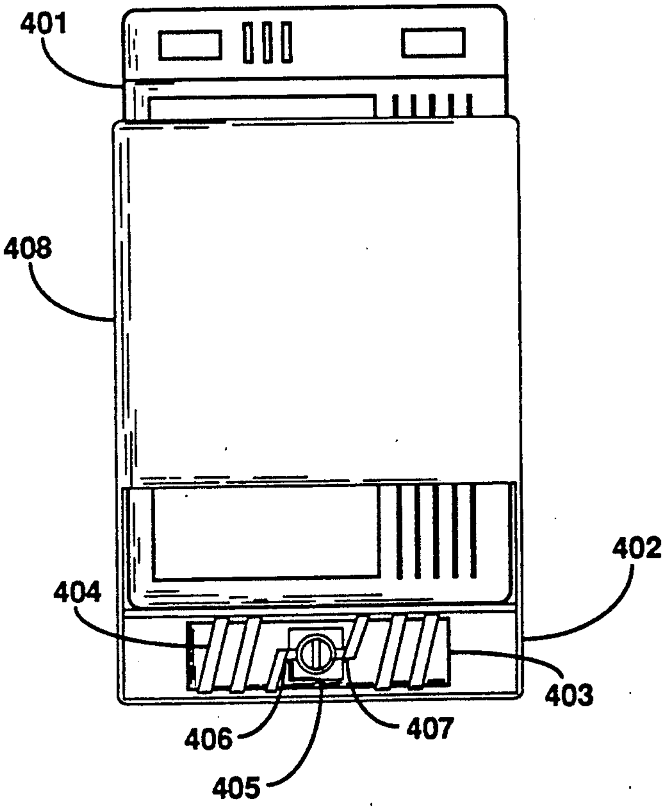
FIG. 4 is a front cutaway view of a selective call receiver coupled to the radio frequency field strength enhancer in accordance with the preferred embodiment.

Referring to FIG. 4, a front view of a selective call receiver 401 coupled to the radio frequency field strength enhancer 402 shows in the lower section (the square cutaway) a ferrite core (403) loop antenna 404 having a plurality of turns, and a tuning impedance 405 coupled to a first 406 and a second 407 terminal of the loop antenna 404. The radio frequency field strength enhancer 402 is formed as a carrying case 408 that is capable of receiving an RF communication device and positioning the loop antenna 404 in close proximity to the RF communication device which in this embodiment is a selective call receiver 401. The high efficiency of the antenna system 403, 404, 405, 406, 407 associated with the radio frequency field strength enhancer 402 is achieved by forming the loop antenna 404 of turns wound around a ferrite core 403 having a magnetic permeability of at least one. An example of a practical implementation of this loop antenna might use a ferrite core having a relative magnetic permeability ranging from 1 to 100. In a preferred embodiment where the loop antenna's impedance as measured at first and second terminals has an impedance that is net inductive ($+jX_1$), and the tuning impedance 405 is an adjustable, high quality factor capacitor having an impedance that is net capacitive ($-jX_2$). In the embodiment shown, the tuning impedance 405 is located at the electrical point of balance that gives the broadest and most uniform antenna pattern when coupled to the selective call receiver's antenna system.

According to the present invention, no physical contacts are required to couple the signal from the enhancer 402 to the selective call receiver's antenna system. Enhancement of the surrounding electromagnetic fields and transfer of the resulting energy is possible in this embodiment without contacts since both the high efficiency radiating structure 403, 404, 405, 406, 407 and the the selective call receiver's antenna system are reciprocally responsive to electromagnetic radiation. By placing the high efficiency radiating structure 403, 404, 405, 406, 407 formed within the carrying case 408 in close proximity to the selective call receiver 401, the higher level of radiated energy from the high efficiency radiating structure 403, 404, 405, 406, 407 in the carrying case 408 is electromagnetically coupled to the selective call receiver's 401 integral antenna system (not shown). This results in a net increase in received signal strength of from three to ten decibels at the selective call receiver's 401 integral antenna system (not shown).

We claim:

1. A radio frequency field strength enhancement system for use with a radio frequency communication device having an integrally mounted antenna system, comprising:

a loop antenna system having a first reactance, at least one tuning impedance capable of achieving a second reactance having a magnitude opposite and at least equal to the first reactance, the at least one tuning impedance being coupled from a first to a second terminal on the loop antenna for adjusting a desired frequency response associated with the loop antenna system, a core having a magnetic permeability of at least one, and a plurality of turns of a conductive material wound around the core, the resulting loop antenna system yielding a high efficiency antenna that re-radiates a received signal at a higher radiated power; and a carrying case capable of receiving and retaining the radio frequency communication device in close proximity to the member such that electromagnetic radiation is coupled between the integrally mounted antenna system and the high efficiency radiating antenna.

2. A radio frequency field strength enhancement system for use with a selective call receiver having an internally mounted antenna system, comprising:

a loop antenna system having a core with a magnetic permeability of at least one, a plurality of turns of a conductive material wound around the core, a first reactance and at least one tuning impedance capable of achieving a second reactance of a magnitude opposite and at least equal to the first reactance, the at least one tuning impedance being coupled from a first to a second terminal on the loop antenna for adjusting a desired frequency response associated with the loop antenna system and resulting in a high efficiency antenna that re-radiates a received signal at a higher radiated power; and a carrying case capable of receiving and retaining the selective call receiver in close proximity to the member such that electromagnetic radiation is coupled between the integrally mounted antenna system and the high efficiency radiating antenna.

3. A radio frequency field strength enhancement system for use with a selective call receiver having an internally mounted antenna system, comprising:

a loop antenna system having a first reactance, a first terminal, and a second terminal, the loop antenna system comprising:

a core having a magnetic permeability of at least one; and a plurality of turns of a conductive material wound around the core;

at least one tuning impedance coupled from the first to the second terminal on the loop antenna, the at least one tuning impedance being capable of achieving a second reactance having a magnitude opposite and at least equal to the first reactance for adjusting a desired frequency response associated with the loop antenna; and a case capable of receiving the selective call receiver and positioning the loop antenna in close proximity to the selective call receiver such that electromagnetic radiation is coupled between the integrally mounted antenna system and the high efficiency radiating antenna.

* * * * *